United States Patent
Zhou et al.

(10) Patent No.: US 8,130,666 B2
(45) Date of Patent: Mar. 6, 2012

(54) MULTIPLE INPUT MULTIPLE OUTPUT COMMUNICATION SYSTEM AND OPERATING METHOD THEREOF

(75) Inventors: Yongxing Zhou, Yongin-si (KR); Sung Jin Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 166 days.

(21) Appl. No.: 12/490,580

(22) Filed: Jun. 24, 2009

(65) Prior Publication Data

US 2009/0323545 A1    Dec. 31, 2009

(30) Foreign Application Priority Data

Jun. 30, 2008 (CN) .......................... 2008 1 0127257
Sep. 12, 2008 (CN) .......................... 2008 1 0213121
May 11, 2009 (KR) ....................... 10-2009-0040588

(51) Int. Cl.
*H04L 1/00* (2006.01)
*H04L 12/26* (2006.01)
*H04L 1/02* (2006.01)
*H04W 4/00* (2009.01)
*H04J 3/26* (2006.01)
*H04J 3/16* (2006.01)
*H04B 1/00* (2006.01)

(52) U.S. Cl. ........ 370/252; 370/329; 370/432; 370/437; 375/144; 375/267

(58) Field of Classification Search .................. 370/252, 370/328, 329, 432, 437; 375/144, 260, 267
See application file for complete search history.

*Primary Examiner* — Ronald Abelson
(74) *Attorney, Agent, or Firm* — NSIP Law

(57) ABSTRACT

A multiple input multiple output (MIMO) communication system having a terminal and a base station. The terminal may calculate channel direction information and channel quality information in a zero-forcing mode based on expected different user interference. The terminal may also calculate channel direction information and channel quality information in a per user unitary rate control (PU2RC) mode by reusing the channel direction information and the channel quality information in the zero-forcing mode. The base station may design a preceding vector based on feedback information from the terminal.

22 Claims, 5 Drawing Sheets

FIG. 4

|  | CHANNEL DIRECTION INFORMATION | CHANNEL QUALITY INFORMATION |
|---|---|---|
| PU2RC MODE | $(\hat{h}_{c \cdot k}^H)_{PU2RC}$ | $\gamma_k^{PU2RC}$ |
| ZERO-FORCING MODE | $(\hat{h}_{c \cdot k}^H)_{ZF}$ | $\gamma_k^{ZF}$ |

FIG. 5

FEEDBACK CONTENTS

| ZERO-FORCING MODE | $\gamma_k^{ZF}$, $(\hat{h}_{c \cdot k}^H)_{ZF}$ |
|---|---|
| PU2RC MODE | $\gamma_k^{PU2RC}$, $(\hat{h}_{c \cdot k}^H)_{PU2RC}$, $\Delta\gamma_k$ |

MULTIPLE INPUT MULTIPLE OUTPUT COMMUNICATION SYSTEM AND OPERATING METHOD THEREOF

CROSS-REFERENCE TO RELATED APPLICATIONS

This application claims the benefit under 35 U.S.C. §119(e) of a Chinese Patent Application No. 200810127257.8, filed on Jun. 30, 2008, and a Chinese Patent Application No. 200810213121.9, filed on Sep. 12, 2008, and the benefit under 35 U.S.C. §119(a) of a Korean Patent Application No. 10-2009-0040588, filed on May 11, 2009, in the Korean Intellectual Property Office, the entire disclosures of which are incorporated herein by reference for all purposes.

BACKGROUND

1. Field

The following description relates to a multiple input multiple output (MIMO) communication system, and more particularly, to a MIMO communication system that may use a codebook of a limited size.

2. Description of the Related Art

A number of researches are being conducted to provide various types of multimedia services and to support high quality and high speed data transmission in a wireless communication environment. Technologies associated with a multiple input multiple output (MIMO) communication system using multiple channels in a spatial area, are in rapid development.

In a MIMO communication system, a base station may use a spatial division multiplexing (SDM) scheme and a spatial division multiplexing access (SDAM) scheme. For example, the base station may simultaneously transmit a plurality of data streams via a plurality of antennas according to the SDM scheme. The base station may transmit the plurality of data stream to multiple users via the plurality of antennas according to the SDMA scheme. In order to effectively transmit the plurality of data streams using the plurality of antennas, the base station may need to verify channel information associated with downlink channels formed between the plurality of antennas of the base station and at least one user.

SUMMARY

In one general aspect, an operating method of a terminal for a multiple input multiple output (MIMO) communication system includes calculating an expected different user interference from an effective received signal, calculating channel quality information and channel direction information in a zero-forcing mode based on the expected different user interference, and feeding back, to a serving base station, the channel direction information and the channel quality information.

The calculating of the channel direction information and the channel quality information in the zero-forcing mode may include calculating a lower-bound of a signal-to-interference plus noise ratio (SINR) of the terminal in the zero-forcing mode using a Jensen's inequality, and calculating the channel direction information and the channel quality information based on the calculated lower-bound.

The calculating of the channel direction information and the channel quality information in the zero-forcing mode may include calculating a combining vector, used to generate the effective received signal from a received signal, in association with calculating of the channel direction information and the channel quality information.

The calculating of the channel direction information and the channel quality information in the zero-forcing mode may include calculating the channel direction information and the channel quality information in the zero-forcing mode, with the assumption that at least one neighboring base station of the serving base station has a maximum transmission power.

In another general aspect, an operating method of a terminal in a MIMO communication system includes calculating channel direction information and channel quality information in a zero-forcing mode with a first codebook corresponding to the zero-forcing mode, calculating medium information that represents a relationship between the channel quality information in the zero-forcing mode and channel quality information in a per user unitary rate control (PU2RC) mode by considering a second codebook corresponding to the PU2RC mode, wherein the second codebook is designed based on the first codebook, and feeding back the medium information to a serving base station.

The second codebook may be designed jointly with the first codebook.

The method may further include calculating channel direction information and channel quality information in the PU2RC mode with the second codebook.

The calculating of the channel direction information and the channel quality information in the PU2RC mode may include calculating the channel direction information and the channel quality information in the PU2RC mode by reusing the channel direction information and the channel quality information in the zero-forcing mode with the second codebook.

The channel direction information in the PU2RC mode may be calculated by the serving base station, based on the channel direction information in the zero-forcing mode and an angle or a chordal distance between elements of the second codebook.

The calculating of the channel direction information and the channel quality information in the PU2RC mode may include calculating the channel direction information in the PU2RC mode based on the channel direction information in the zero-forcing mode and an angle or a chordal distance between elements of the second codebook.

The medium information may be associated with a difference between the channel quality information in the zero-forcing mode and the channel quality information in the PU2RC mode.

The method may further include feeding back the channel direction information and the channel quality information in the zero-forcing mode.

The method may further include calculating an expected different user interference from an effective received signal.

The method may further include feeding back, to the serving base station, an indicator that indicates whether a dedicated reference signal is required.

In still another general aspect, an operating method of a base station in a MIMO communication system includes recognizing channels formed between at least two users and the base station, based on feedback information that is transmitted from the at least two users, setting an initial value of a precoding vector $$v = \frac{1}{2}[1 \quad e^{j\theta_2} \quad e^{j\theta_3} \quad e^{j\theta_4}]^T$$

for a target user by considering a channel $$v_j = \frac{1}{2}[1 \quad \alpha \quad \beta \quad \gamma]^T$$

of a neighboring user, where $\alpha, \beta, \gamma$ denote complex numbers, calculating $|v^H v_i|$ where $v_i$ denotes a channel of the target user, using at least one scheme among at least two schemes that are pre-defined according to a value of $(\alpha)^* e^{j\theta_2}$, and optimizing the preceding vector $$v = \frac{1}{2}[1 \quad e^{j\theta_2} \quad e^{j\theta_3} \quad e^{j\theta_4}]^T$$

based on the calculated $|v^H v_i|$.

The calculating of $|v^H v_i|$ may include calculating $|v^H v_i|$ by using $$e^{j\theta_4} = -\frac{\alpha^* e^{j\theta_2}}{\gamma^*} \text{ and } e^{j\theta_3} = -\frac{1}{\beta^*}$$

according to the value of $(\alpha)^* e^{j\theta_2}$.

The calculating of $|v^H v_i|$ may include calculating $|v^H v_i|$ by using $$e^{j\theta_3} = -\frac{\alpha^* e^{j\theta_2}}{\beta^*} \text{ and } e^{j\theta_4} = -\frac{1}{\gamma^*}$$

according to the value of $(\alpha)^* e^{j\theta_2}$.

The calculating of $|v^H v_i|$ may include calculating $|v^H v_i|$ by using $$\theta_3 = \frac{2\pi}{N} \cdot i \text{ and } e^{j\theta_4} = -\frac{\beta^* e^{j\theta_3}}{\gamma^* *}$$

according to the value of $(\alpha)^* e^{j\theta_2}$.

In yet another general aspect, an operating method of a base station in a MIMO communication system includes recognizing channels formed between a user k and a user m, and the base station, based on feedback information that is transmitted from the user k and the user m, generating $\Psi_m$ and $\Psi_k$ according to $\Psi_i = \{v_j \langle v_j, v_i \rangle = 0, v_j \in C\} \forall v_i \in C$, where C denotes a codebook, and determining, using $\Psi_m$ and $\Psi_k$, a precoding vector for the user k as $$f_k = \frac{1}{|\langle \hat{h}_{c,k}^H, v_j \rangle|} \underset{v_j \in \Psi_m}{\mathrm{argmax}} |\langle \hat{h}_{c,k}^H, v_j \rangle|$$

where $\hat{h}_{c,k}^H$ denotes an element indicating a channel of the user k among elements of the codebook, and a precoding vector for the user m as $$f_m = \frac{1}{|\langle \hat{h}_{c,m}^H, v_j \rangle|} \underset{v_j \in \Psi_k}{\mathrm{argmax}} |\langle \hat{h}_{c,m}^H, v_j \rangle|$$

where $\hat{h}_{c,m}^H$ denotes an element indicating a channel of the user m among the elements of the codebook.

In yet another general aspect, an operating method of a terminal in a MIMO communication system includes calculating channel direction information and channel quality information in a zero-forcing mode with a first codebook corresponding to the zero-forcing mode, and calculating channel direction information and channel quality information in a PU2RC mode by reusing the channel direction information and the channel quality information in the zero-forcing mode by considering a second codebook corresponding to the PU2RC mode, wherein the second codebook is designed based on the first codebook.

The second codebook may be designed jointly with the first codebook.

In yet another general aspect, an operating method of a base station in a MIMO communication system includes receiving at least one of channel direction information and channel quality information in a zero-forcing mode that are generated based on a first codebook corresponding to the zero-forcing mode, and channel direction information and channel quality information in a PU2RC mode that are generated based on a second codebook corresponding to the PU2RC mode, wherein the second codebook is designed based on the first codebook, and calculating the channel direction information and the channel quality information in the PU2RC mode based on the channel direction information and the channel quality information in the zero-forcing mode, or calculating the channel direction information and the channel quality information in the zero-forcing mode based on the channel direction information and the channel quality information in the PU2RC mode.

The second codebook may be designed jointly with the first codebook.

The method may further include receiving medium information that represents a relationship between the channel quality information in the zero-forcing mode and the channel quality information in the PU2RC mode, wherein the calculating of the channel direction information and the channel quality information in the PU2RC mode or the calculating of the channel direction information and the channel quality information in the zero-forcing mode comprises calculating the channel direction information and the channel quality information in the PU2RC mode based on the channel direction information and the channel quality information in the zero-forcing mode using the medium information, or calculating the channel direction information and the channel quality information in the zero-forcing mode based on the channel direction information and the channel quality information in the PU2RC mode using the medium information.

The calculating of the channel direction information and the channel quality information in the PU2RC mode or the calculating of the channel direction information and the channel quality information in the zero-forcing mode may include calculating the channel direction information and the channel quality information in the PU2RC mode by reusing the channel direction information and the channel quality information in the zero-forcing mode, or calculating the channel direction information and the channel quality information in the zero-forcing mode by reusing the channel direction information and the channel quality information in the PU2RC mode.

Other features and aspects will be apparent from the following detailed description, the drawings, and the claims.

BRIEF DESCRIPTION OF THE DRAWINGS

FIG. 4 is a table illustrating an example of channel direction information and channel quality information corresponding to a per user unitary rate control (PU2RC) mode and a zero-forcing mode.

FIG. 5 is a table illustrating an example of feedback contents used in a zero-forcing mode and a PU2RC mode.

Figure 1:
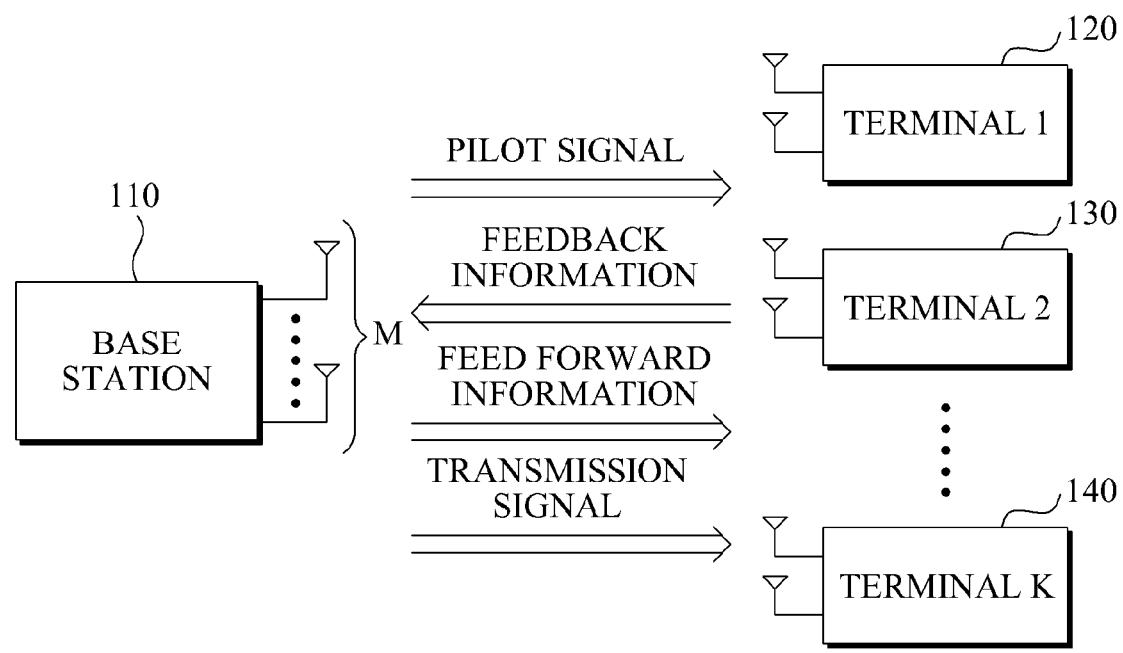
FIG. 1 is a diagram illustrating an exemplary multiple input multiple output (MIMO) communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, description of well-known functions and constructions may be omitted for increased clarity and conciseness.

FIG. 1 illustrates a multiple input multiple output (MIMO) communication system according to an exemplary embodiment. The exemplary system may be a multi-user MIMO communication system.

Referring to FIG. 1, the MIMO communication system includes a base station 110 and a plurality of users (terminal 1, terminal 2, ... terminal K) 120, 130, and 140. M transmit antennas may be provided in the base station 110. At least one or two receive antennas may be provided in each of the users (terminal 1, terminal 2, ... terminal K) 120, 130, and 140.

Channels, for example, downlink channels or uplink channels, may exist between the base station 110 and each of the users (terminal 1, terminal 2, ... terminal K) 120, 130, and 140. The base station 110 and each of the users (terminal 1, terminal 2, ... terminal K) 120, 130, and 140 may transmit and receive signals via the channels.

The base station 110 may simultaneously transmit a plurality of data streams to the plurality of users (terminal 1, terminal 2, ... terminal K) 120, 130, and 140. Here, the base station 110 may operate in various types of modes such as a spatial division multiplexing access (SDMA) mode, a zero-forcing beamforming mode (referred to herein as zero-forcing mode), a per user unitary rate control (PU2RC) mode, and the like. Here, PU2RC is unitary precoding and thus, the base station 110 may schedule only orthogonal users and precode data streams in the PU2RC mode. In the zero-forcing mode, the base station 110 may simultaneously perform beamforming for even non-orthogonal users. Also, in the zero-forcing mode, the base station 110 may use a precoding matrix or a precoding vector that is appropriately designed so that signals towards simultaneously scheduled different users may become zero.

The base station 110 may need to verify channel information associated with the downlink channels in order to perform beamforming or to select at least one user from the plurality of users (terminal 1, terminal 2, ... terminal K) 120, 130, and 140. The channel information may include channel direction information or preferred preceding matrix information, channel quality information, and the like.

For example, the base station 110 may select at least one user from the plurality of users (terminal 1, terminal 2, ... terminal K) 120, 130, and 140 using various types of user selection algorithms such as a greedy user selection (GUS) algorithm, a semi-orthogonal user selection (SUS) algorithm, and the like.

The base station 110 may transmit pilot signals to the plurality of users (terminal 1, terminal 2, ... terminal K) 120, 130, and 140 via the downlink channels. The pilot signals may be well known to the base station 110 and the plurality of users (terminal 1, terminal 2, ... terminal K) 120, 130, and 140. Each of the users (terminal 1, terminal 2, ... terminal K) 120, 130, and 140 may estimate the downlink channels formed between the base station 110 and each of the users (terminal 1, terminal 2, ... terminal K) 120, 130, and 140.

Each of the users (terminal 1, terminal 2, ... terminal K) 120, 130, and 140 may feed back channel information associated with the downlink channels to the base station 110 based on the estimates of the downlink channels. Here, the channel information fed back from the users (terminal 1, terminal 2, ... terminal K) 120, 130, and 140 to the base station 110 may be referred to as "feedback information".

Each of the users (terminal 1, terminal 2, ... terminal K) 120, 130, and 140 may use a codebook with a limited size in order to decrease a feedback overhead. For example, the plurality of users (terminal 1, terminal 2, ... terminal K) 120, 130, and 140 may feed back, to the base station 110, information, for example, index information associated with at least one of elements included in the codebook with the limited size, based on the estimates of the downlink channels, so as to decrease the feedback overhead.

For illustration, it is assumed that M transmit antennas are provided in the base station 110 and K users exist with respect to the base station 110. Also, it is assumed that each of the K users includes Nr receive antennas, and each of the base station 110 and the K users uses a codebook that includes $2^B$ unit norm vectors. Each of the $2^B$ unit norm vectors may have a size of M×1. Here, B denotes a number of feedback bits.

Hereinafter, for illustration, it is assumed that a codebook is $C \triangleq \{v_1, \ldots v_{2^B}\}$, the base station 110 schedules a subset $S \subseteq \{1, \ldots, K\}$ of the users, and a maximum number of data streams allocated to each of the users is fixed to "1" in a limited feedback environment. In a multi-cell and multi-sector environment, a received signal of the users may be given by the following Equation 1:

$$y = HG(S)u + I_{inter} + n \qquad (1).$$

Here, H denotes a channel matrix between the base station 110 and the subset $S \subseteq \{1, \ldots, K\}$ of the users, G denotes a transmit matrix, u denotes data streams, I denotes inter-cell interference, $\epsilon[uu^H] = I_{|S|}$, and $G = [g_1, \ldots, g_{|S|}]$. Here, a generation scheme of $G = [g_1, \ldots, g_{|S|}]$ may depend on a multi-user MIMO mode, for example, an SDMA mode, a zero-forcing mode, and the like. $y = [y_1, \ldots, y_{|S|}]^T$ denotes a vector of signals received by each of scheduled |S| users, and n denotes a complex Gaussian noise vector.

$H=[h_{c,1}{}^T, \ldots, h_{c,k}{}^T, \ldots h_{c,|S|}{}^T]^T$ denotes a channel matrix of a physical channel from the M transmit antennas to the |S| users, and $h_{c,k}$ denotes an effective channel of a user k. Here, $h_{c,k}=w_k H_k$, where $h_{c,k}$ denotes an 1×M vector, and $w_k$ of the user k denotes a beamforming vector or a combining vector.

Where a received signal of the user k is $r_k$, an effective received signal of the user k may be given by the following Equation 2:

$$y_k = w_k r_k = w_k H_k g_k u_k + w_k H_k \sum_{i \in S, i \neq k} g_i u_i + w_k \sum_r H_k^r \sum_t g_t^r d_t^r + n_k. \quad (2)$$

For example, the user k may generate the effective received signal $y_k$ by multiplying the received signal $r_k$ by $w_k$. Here, $d_t^r$ denotes an item that indicates inter-cell interference from an $r^{th}$ base station and a $j^{th}$ beam to the user k. $\epsilon[d_t^r(d_t^r)^H]=1 \ \forall r,t$, and $\epsilon[d_{t1}^{r1}(d_{t2}^{r2})^H]=0 \ \forall t1 \neq t2$ or $r1 \neq r2$. $H_k^r$ denotes a physical channel from the $r^{th}$ base station to the user k.

For zero-forcing beamforming, the user k may quantize a direction of the effective channel $h_{c,k}$. For example, the direction of the effective channel $h_{c,k}$ of the user k may be quantized to $\hat{h}_{c,k}=h_{c,k}/\|h_{c,k}\|$. $\tilde{h}_{c,k}=h_{c,k}/\|h_{c,k}\|$ denotes a unit norm vector $\hat{h}_{c,k}$ that is selected from a plurality of elements included in a codebook C. Where all the |S| users quantize their effective channels, the quantized effective channels may be expressed by $\hat{H}(S)=[\hat{h}_{c,1}{}^T, \ldots, \hat{h}_{c,|S|}{}^T]^T$.

A zero-forcing transmit matrix may be given by the following Equation 3:

$$G(S) = F(S)\text{diag}(p)^{1/2} \quad (3)$$
$$= \hat{H}(S)^H \left(\hat{H}(S)\hat{H}(S)^H\right)^{-1} \text{diag}(p)^{1/2}.$$

Here, F(s) denotes a precoding matrix for selected users, and $P=[p_1, \ldots p_K]^T$ denotes a vector of power normalization coefficients that impose a power constraint of a transmission signal. For an equal power allocation across selected users, $p_k=(P/|S|)\|f_k\|^{-2}$. Here, $f_k$ denotes a $k^{th}$ column of F(s).

Figure 2:
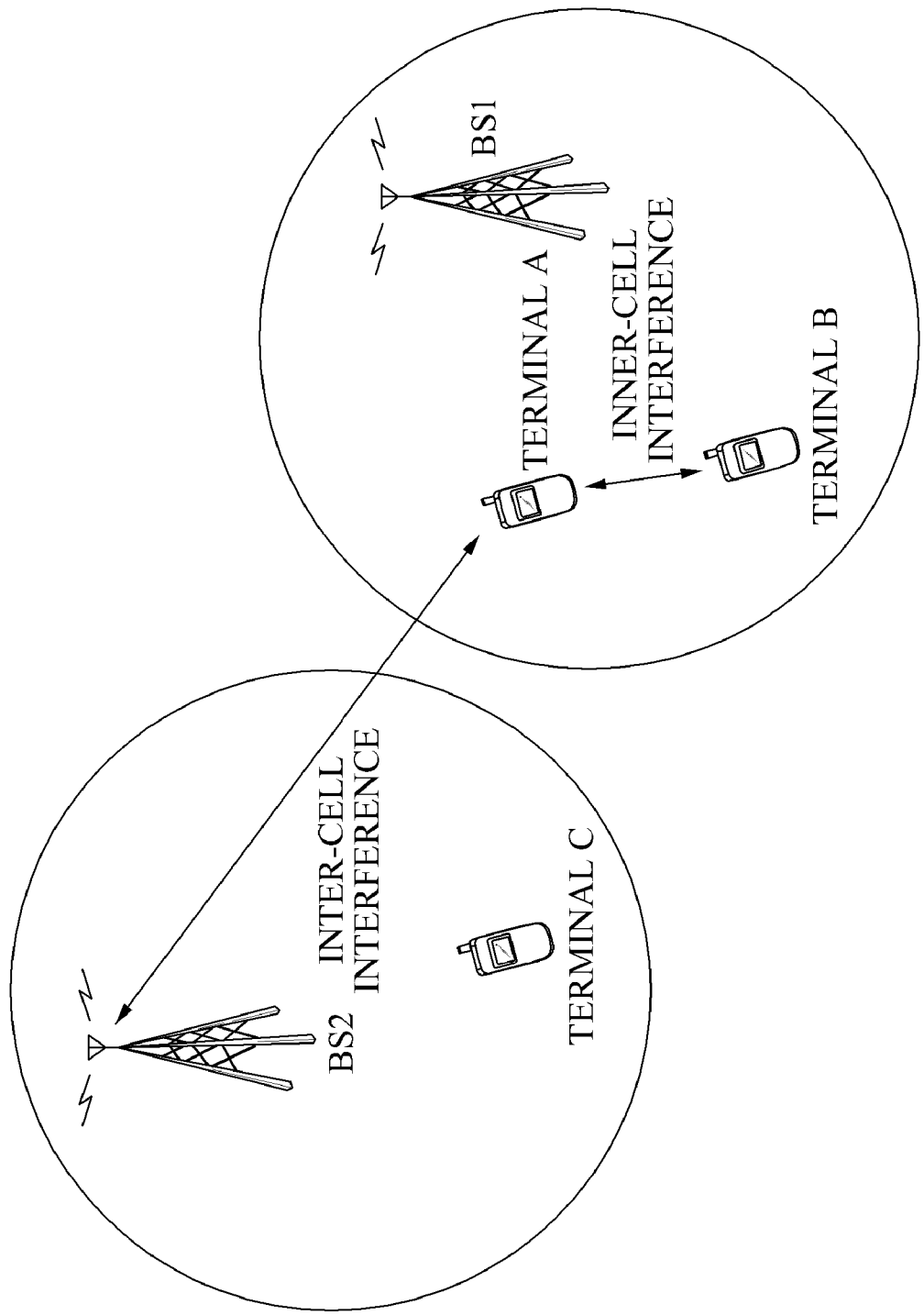
FIG. 2 is a diagram illustrating an example of an inter-cell interference and an inner-cell interference.

FIG. 2 illustrates an example of inter-cell interference and inner-cell interference.

Referring to FIG. 2, a terminal A may receive a transmission signal that is transmitted from a base station (BS2) to a terminal C. In this case, the transmission signal of the base station (BS2) may act as the inter-cell interference against the terminal A.

Also, the inner-cell interference may occur in the terminal A. For example, a base station (BS1) may perform beamforming for multiple streams using, for example, a UP2RC scheme, a zero-forcing beamforming scheme, and the like, so as to simultaneously transmit signals to the terminal A and a terminal B. In this case, a signal corresponding to a beam for the terminal B, among beams formed by the base station (BS1), may act as the inner-cell interference against the terminal A. A signal corresponding to a beam for the terminal A, among the beams formed by the base station (BS1), may act as the inner-cell interference against the terminal B.

Figure 3:
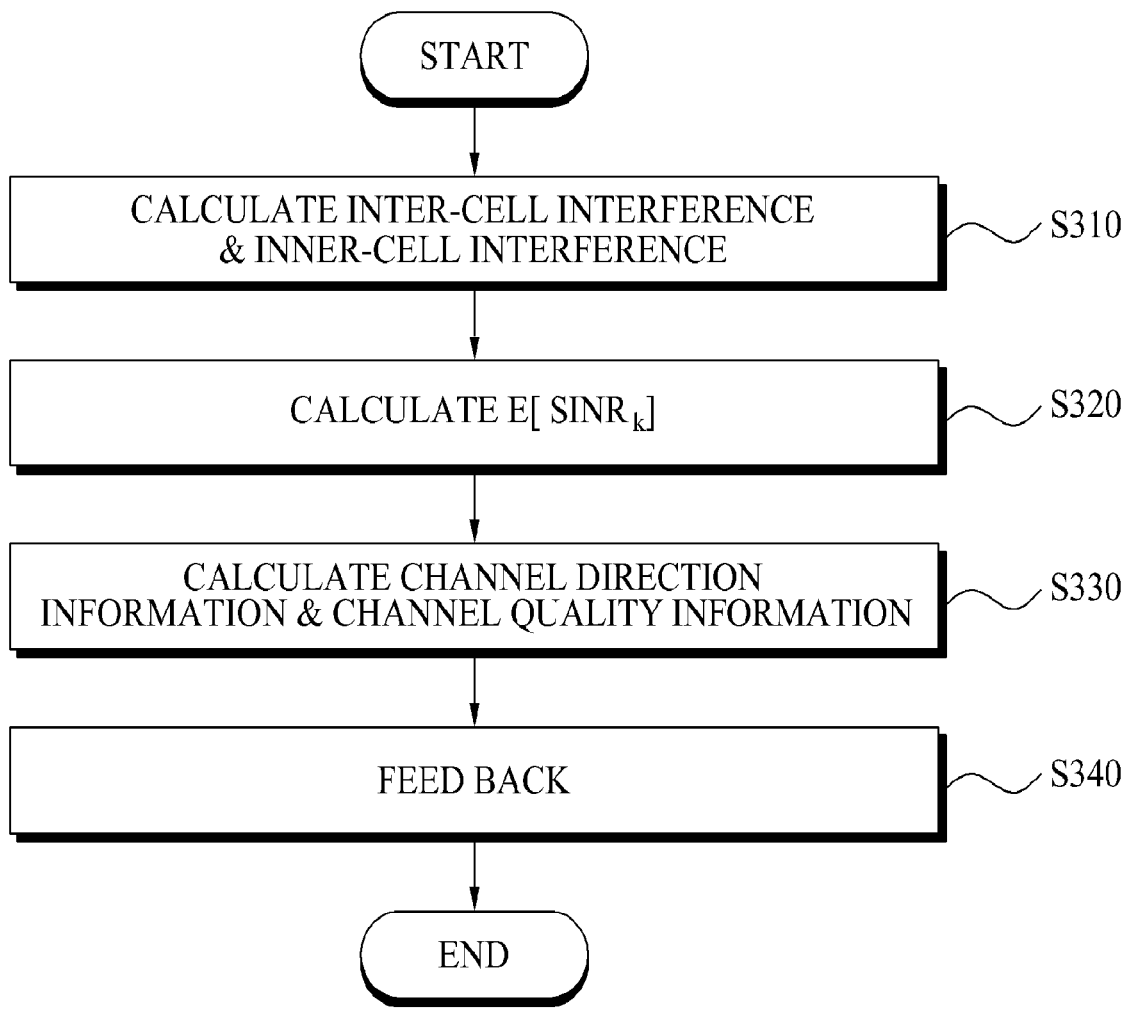
FIG. 3 is a flowchart illustrating an exemplary operating method of a terminal.

FIG. 3 illustrates an operating method of a terminal according to an exemplary embodiment. The method may be utilized in, for example, the MIMO communication system of FIG. 1.

Referring to FIG. 3, in operation S310, a terminal selected by a base station calculates an expected different user interference. The expected different user interference may include expected inter-cell interference and/or expected inner-cell interference.

Here, the expected inner-cell interference may be calculated through $$\frac{P}{|S|}\|h_{c,k}\|^2 \sin^2\theta_k E\left[\sum_{i \in S\setminus\{k\}} |\tilde{e}_k \tilde{f}_i|^2\right].$$

The expected inter-cell interference may be calculated through $$w_k E\left[\sum_r H_k^r \sum_t g_t^r \left(\sum_r H_k^r \sum_t g_t^r\right)^H\right] w_k^H.$$

In operation S320, the terminal calculates $E[SINR_k]$ in, for example, a zero-forcing mode by considering the expected different user interference. For example, the terminal may calculate $E[SINR_k]$ in the zero-forcing mode based on at least one of the expected inter-cell interference and the expected inner-cell interference.

The terminal may calculate $E[SINR_k]$ in the zero-forcing mode by calculating a lower-bound of $E[SINR_k]$ using, for example, a Jensen's inequality. For example, the terminal may use the following Equation 4:

$$E[SINR_k] \geq \frac{\frac{P}{|S|}\|h_{c,k}\|^2\left|\left(\hat{h}_{c,k}\hat{h}_{c,k}^H\right)(\hat{h}_{c,k}\tilde{f}_k) + e_k \tilde{f}_k\right|^2}{1 + w_k E\left[\sum_r H_k^r \sum_t g_t^r \left(\sum_r H_k^r \sum_t g_t^r\right)^H\right]w_k^H + \frac{P}{|S|}\|h_{c,k}\|^2\sin^2\theta_k E\left[\sum_{i \in S\setminus\{k\}} |\tilde{e}_k \tilde{f}_i|^2\right]} \approx \quad (4)$$

$$\frac{\frac{P}{|S|}\|h_{c,k}\|^2\left|\left(\hat{h}_{c,k}\hat{h}_{c,k}^H\right)(\hat{h}_{c,k}\tilde{f}_k) + e_k \tilde{f}_k\right|^2}{1 + w_k\left(\sum_j |H_k^j|^2\right)w_k^H + \frac{P}{|S|}\frac{|S|-1}{M-1}\|h_{c,k}\|^2\sin^2\theta_k} \approx$$

$$\frac{p_k\|h_{c,k}\|^2\cos^2\theta_k}{1 + w_k\left(\sum_j |H_k^j|^2\right)w_k^H + \frac{P}{|S|}\frac{|S|-1}{M-1}\|h_{c,k}\|^2\sin^2\theta_k}$$

Here, $H_k^j$ denotes a physical channel from $j^{th}$ inter-cell interference to the user k.

In operation S330, the terminal calculates channel direction information and channel quality information in the zero-forcing mode.

Here, it is assumed that constant coefficient beamforming is used in neighboring cells and each of transmit antennas of the neighboring cells adopts a maximum transmission power. Here, since $p_k$ may not be known to users, channel quality information $\gamma_k$ in the zero-forcing mode of the user k may be defined by the following Equation 5:

$$\gamma_k \triangleq \frac{\frac{P}{|S|}\|h_{c,k}\|^2 \cos^2 \theta_k}{1 + w_k\left(\sum_j |\mathcal{H}_k^j|^2\right)w_k^H + \alpha\frac{P}{|S|}\frac{|S|-1}{M-1}\|h_{c,k}\|^2 \sin^2 \theta_k}. \quad (5)$$

Here, $\alpha$ denotes a constant, and $1 \leq \alpha \leq M-1$. An approximated lower-bound with respect to an expected SINR of the user k may be re-written as given by the following Equation 6:

$$\gamma_k = \frac{\frac{P}{|S|}\left|w_k H_k \hat{h}_{c,k}^H\right|^2}{1 + w_k\left(\sum_j |\mathcal{H}_k^j|^2\right)w_k^H + \alpha\frac{P}{|S|}\frac{|S|-1}{M-1}\left\|w_k H_k - \left(w_k H_k \hat{h}_{c,k}^H\right)\hat{h}_{c,k}\right\|^2}. \quad (6)$$

After matrix manipulations, $$\gamma_k = \frac{w_k A_k w_k^H}{1 + w_k B_k w_k^H}$$

may be obtained. Here, $$A_k = \frac{P}{|S|}\left(H_k \hat{h}_{c,k}^H \hat{h}_{c,k} H_k^H\right),$$

$$B_k = \alpha\frac{P}{|S|}\frac{|S|-1}{M-1}\left(H_k\left(I - \hat{h}_{c,k}^H \hat{h}_{c,k}\right)H_k^H\right) + \left(\sum_j |\mathcal{H}_k^j|^2\right),$$

and $\hat{h}_{c,k}^H \in C$.

In this case, the following Equation 7 may be defined:

$$w_k^H = (I + B_k)^{-1}\sqrt{\frac{P}{|S|}}H_k \hat{h}_{c,k}^H. \quad (7)$$

The optimal combining vector $w_k$ for the user k and the optimal quantized effective channel $\hat{h}_{c,k}$ may be optimized according to the following Equation 8:

$$\left(w_k, \hat{h}_{c,k}^H\right) = \underset{\|w_k\|=1, \hat{h}_{c,k}^H \in C}{\operatorname{argmax}} \gamma_k\left(w_k, \hat{h}_{c,k}^H\right). \quad (8)$$

For example, since $\hat{h}_{c,k}^H \in C$, the user k may obtain the optimal quantized effective channel $\hat{h}_{c,k}$ using the above Equation 8. Also, the user k may obtain the optimal combining vector $w_k$ using optimal $\hat{h}_{c,k}$ and the above Equation 7. Accordingly, the user k may generate an index of optimal $\hat{h}_{c,k}$ as the channel direction information and may also generate, as the channel quality information, optimal $\gamma_k$ that is calculated using the above Equation 6 and optimal $\hat{h}_{c,k}$.

In operation S340, the user k (the terminal) feeds back, to the base station, the channel direction information and the channel quality information in the zero-forcing mode.

FIG. 4 illustrates channel direction information and channel quality information corresponding to a PU2RC mode and a zero-forcing mode according to an exemplary embodiment.

A multi-user MIMO communication system according to an exemplary embodiment may adaptively use one of the zero-forcing mode and the PU2RC mode. Switching between the zero-forcing mode and the PU2RC mode may be either dynamic or semi-static.

As shown in a table of FIG. 4, in order to support both the zero-forcing mode and the PU2RC mode, a base station may need to verify channel direction information $(\hat{h}_{c,k}^H)_{ZF}$ in the zero-forcing mode and channel direction mode $(\hat{h}_{c,k}^H)_{PU^2RC}$ in the PU2RC mode. The base station may need to verify channel quality information $\gamma_k^{ZF}$ in the zero-forcing mode and channel quality information $\gamma_k^{PU^2RC}$ in the PU2RC mode.

Hereinafter, an exemplary control signaling of the multi-user MIMO communication system will be described.

The control signaling may include downlink control signaling carried in a physical downlink control channel (PDCCH) and uplink control signaling carried in a physical uplink control channel (PUCCH).

Dynamic Switching Between a Zero-Forcing Mode and a PU2RC Mode

At least two types of codebooks for constant modulus beamforming may be provided as follows. For example, a first code C1 with a relatively large size may be used for a zero-forcing mode. A second codebook C2 with a relatively small size may be used for a PU2RC mode. The second codebook C2 may be designed jointly with the first codebook C1. For example, the second codebook C2 may be a subset of the first codebook C1.

The channel quality information $\gamma_k^{ZF}$ and the channel direction information $(\hat{h}_{c,k}^H)_{ZF}$ in the zero-forcing mode may be calculated according to the above Equations 4 through 8 with the first codebook 1. Here, the channel direction information $(\hat{h}_{c,k}^H)_{PU^2RC}$ in the PU2RC mode may be calculated by reusing the channel direction information $(\hat{h}_{c,k}^H)_{ZF}$ in the zero-forcing mode. However, the channel direction information $(\hat{h}_{c,k}^H)_{PU^2RC}$ in the PU2RC mode may need to be calculated with the second codebook C2. Accordingly, $(\hat{h}_{c,k}^H)_{ZF}$ may be mapped to $(\hat{h}_{c,k}^H)_{PU^2RC}$ based on a chordal distance for un-correlated channels with the second codebook C2. For example, $(\hat{h}_{c,k}^H)_{PU^2RC}$ may be calculated according to the following Equation 9:

$$(\hat{h}_{c,k}^H)_{PU^2RC} = \underset{\|q_i\|=1, q_i \in C_2}{\operatorname{argmin}} \left\|(\hat{h}_{c,k}^H)_{ZF}(\hat{h}_{c,k})_{ZF} - q_i q_i^H\right\|_F. \quad (9)$$

A terminal may calculate $(\hat{h}_{c,k}^H)_{PU^2RC}$, based on an angle between $(\hat{h}_{c,k}^H)_{ZF}$ and elements included in the second codebook C2, using the following Equation 10:

$$(\hat{h}_{c,k}^H)_{PU^2RC} = \underset{\|q_i\|=1, q_i \in C_2}{\operatorname{argmax}} \left\|(\hat{h}_{c,k}^H)_{ZF} q_i\right\|. \quad (10)$$

Channel quality information of a user k in the PU2RC mode $\gamma_k^{PU^2RC}$ may be calculated according to the above Equations 4 through 8 with $(\hat{h}_{c,k}^H)_{PU^2RC}$.

Feedback contents in the PUCCH may include the channel quality information $\gamma_k^{ZF}$ and channel direction information $(\hat{h}_{c,k}^H)_{ZF}$ in the zero-forcing mode, and $\Delta\gamma_k$. Here, $\Delta\gamma_k$ may be associated with a difference between the channel quality information $\gamma_k^{ZF}$ in the zero-forcing mode and the channel quality information $\gamma_k^{PU^2RC}$ in the PU2RC mode. For example, it may be defined as $$\Delta\gamma_k \triangleq \frac{2}{M}\gamma_k^{ZF} - \gamma_k^{PU^2RC}.$$

Where the base station supports simultaneously scheduled two users, the base station may require $\gamma_k^{ZF}$ and $(\hat{h}_{c,k}^H)_{ZF}$ in the zero-forcing mode. On the other hand, where the base station operates in the PU2RC mode, the base station may require $(\hat{h}_{c,k}^H)_{PU^2RC}$ and $\gamma_k^{PU^2RC}$ in the PU2RC mode. Accordingly, the terminal may feed back $\gamma_k^{PU^2RC}$ to the base station, and may also feed back $\Delta\gamma_k$ to the base station, instead of feeding back $\gamma_k^{PU^2RC}$. Here, the base station may verify $\gamma_k^{PU^2RC}$ through $$\Delta\gamma_k \triangleq \frac{2}{M}\gamma_k^{ZF} - \gamma_k^{ZF} - \gamma_k^{PU^2RC}.$$

According to an exemplary embodiment, a base station may receive, from a terminal, channel direction information and channel quality information in a zero-forcing mode that are generated based on a first codebook corresponding to the zero-forcing mode, so as to calculate channel direction information and channel quality information in a PU2RC mode. In another aspect, the base station may receive, from the terminal, the channel direction information and the channel quality information in the PU2RC mode so as to calculate the channel direction information and the channel quality information in the zero-forcing mode. Here, the base station may calculate the channel direction information and the channel quality information in the PU2RC mode by reusing the channel direction information and the channel quality information in the zero-forcing mode, or may calculate the channel direction information and the channel quality information in the zero-forcing mode by reusing the channel direction information and the channel quality information in the PU2RC mode. For example, the base station may use medium information to calculate the channel direction information and the channel quality information in the PU2RC mode, or to calculate the channel direction information and the channel quality information in the zero-forcing mode.

Where the base station overrides feedback of users, the users may require a dedicated reference signal (DRS) for a demodulation phase reference. A multi-user MIMO communication system according to an exemplary embodiment may use an indicator that indicates whether the DRS is required in a PDCCH. The indicator may decrease the overhead of the DRS. For example, where the indicator is "1", it may indicate that the DRS is switched on. Where the indicator is zero, "0", it may indicate that the DRS is switched off.

Semi-Static Switching Between a Zero-Forcing Mode and a PU2RC Mode

As described above, $\gamma_k^{ZF}$ and $(\hat{h}_{c,k}^H)_{ZF}$ may be calculated with the first codebook C1. The feedback contents in the zero-forcing mode may include $\gamma_k^{ZF}$ and $(\hat{h}_{c,k}^H)_{ZF}$. Also, $\gamma_k^{PU^2RC}$ and $(\hat{h}_{c,k}^H)_{PU^2RC}$ in the PU2RC mode may be calculated with the second codebook C2. The feedback contents in the PU2RC mode may include $\gamma_k^{PU^2RC}$ and $(\hat{h}_{c,k}^H)_{PU^2RC}$.

According to an aspect, the indicator described above may be used in the semi-static switching between the zero-forcing mode and the PU2RC mode. The indicator may indicate whether a DRS is required in a PDCCH. The indicator may decrease the overhead of the DRS. For example, where the indicator is "1", it may indicate that the DRS is switched on. Where the indicator is zero, "0", it may indicate that the DRS is switched off.

FIG. 5 illustrates an example of feedback contents used in a zero-forcing mode and a PU2RC mode in dynamic switching according to an exemplary embodiment.

Referring to FIG. 5, the feedback contents in the zero-forcing mode may include channel quality information $\gamma_k^{ZF}$ and channel direction information $(\hat{h}_{c,k}^H)_{ZF}$ in the zero-forcing mode. Where a mode is switched from the zero-forcing mode to the PU2RC mode, the feedback contents may include the channel quality information $\gamma_k^{ZF}$ and the channel direction information $(\hat{h}_{c,k}^H)_{ZF}$ in the zero-forcing mode, and medium information $\Delta\gamma_k$.

Figure 6:
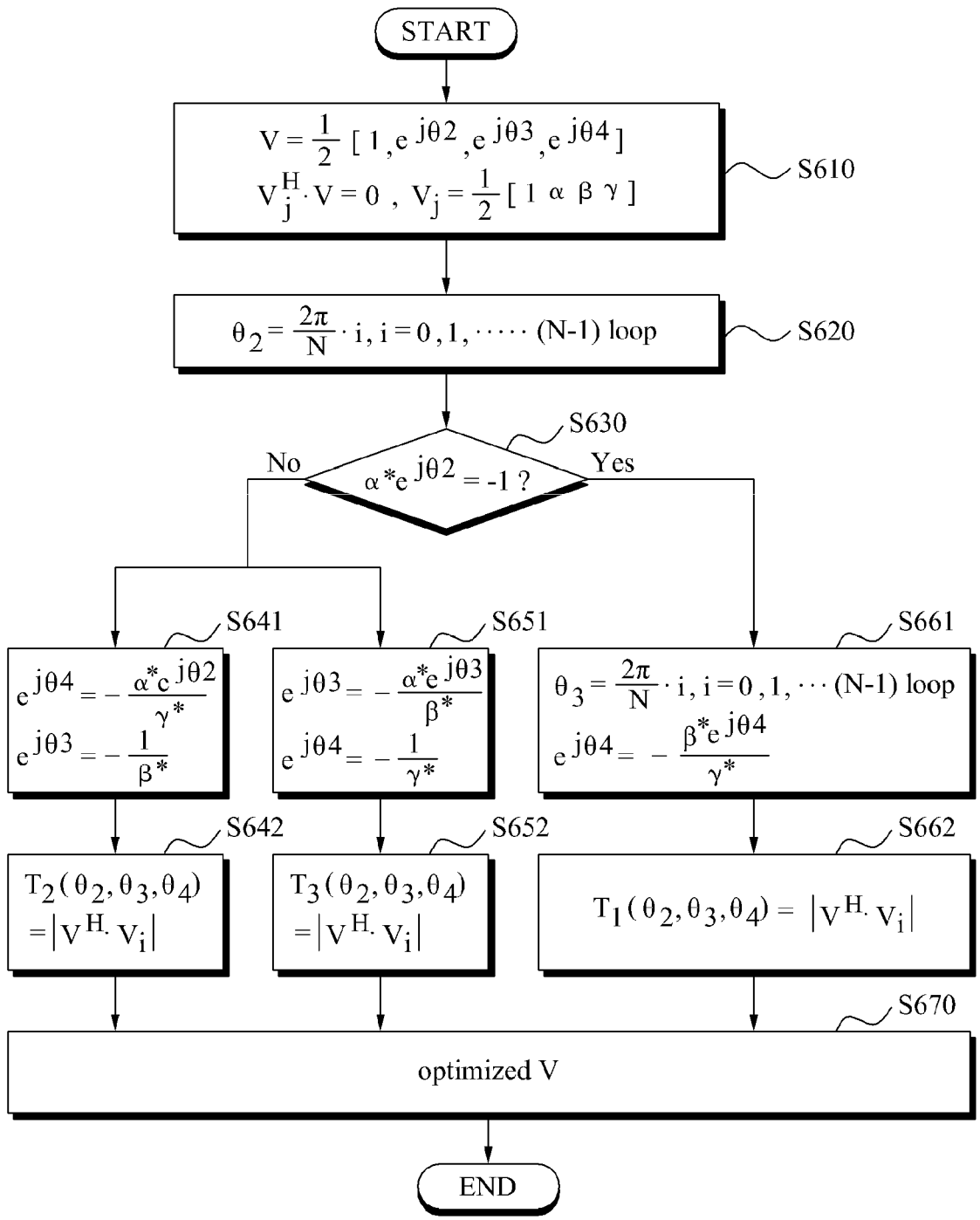
FIG. 6 is a flowchart illustrating an exemplary operating method of a base station.

FIG. 6 illustrates an operating method of a base station according to an exemplary embodiment. The method may be utilized in, for example, the MIMO communication system of FIG. 1.

Prior to describing the operating method of the base station with reference to FIG. 6, a general transmit matrix in a zero-forcing mode may be calculated by $\hat{H}(S)^H(\hat{H}(S)\hat{H}(S)^H)^{-1}$. Here, the general transmit matrix $\hat{H}(S)^H(\hat{H}(S)\hat{H}(S)^H)^{-1}$ may need to be changed in order to decrease a power loss penalty.

Initially, the power loss penalty caused by a power imbalance may be analyzed. Channel quality information $\gamma_k^{ZF}$ of a user k in the zero-forcing mode may be calibrated according to $$E[SINR_k] \geq \frac{\gamma_k}{\|f_k\|^2}.$$

However, a more stringent constraint $$P_i \leq \frac{P}{M} \forall i \in \{1, \ldots, M\}$$

may be applied in a practical MIMO communication system. The base station may calibrate the channel quality information $\gamma_k^{ZF}$ from the user k to avoid breaking the constraint of $$P_i \leq \frac{P}{M} \forall i \in \{1, \ldots, M\}$$

$$E[SINR_k] \geq \frac{\gamma_k}{\|f_k\|^2 \varepsilon_k} \text{ and } \varepsilon_k = \frac{\max_i |f_k(i)|^2}{\|f_k\|^2} \cdot \frac{M}{1}$$

are defined. Here, $f_k(i)$ denotes an $i^{th}$ element of $f_k$ and the overall power loss of the user k is defined by $LO_k = \|f_k\|^2 \varepsilon_k$. Where $f_k$ is a constant modulus, $\varepsilon_k = 1$. Where $f_k$ is not the constant modulus, $\varepsilon_k > 1$.

The base station may design a precoding vector or a precoding matrix in the zero-forcing mode according to various types of schemes. Hereinafter, three exemplary schemes will be described.

First Scheme

Here, it is assumed that a user k and a user m are simultaneously scheduled, $\hat{h}_{c,k}^H = v_i$, and $\hat{h}_{c,m}^H = v_j$. Here, $v_i \in C$, $v_j \in C$, $i \neq j$.

Referring to FIG. 6, where it is assumed that v is a precoding vector for a user i, the base station assumes that $$v = \frac{1}{2}[1 \quad e^{j\theta_2} \quad e^{j\theta_3} \quad e^{j\theta_4}]^T$$

in operation S610. Here, $$v_j^H \cdot v = 0, \text{ and } v_j = \frac{1}{2}[1 \quad \alpha \quad \beta \quad \gamma]^T.$$

In operation S620, the base station assumes that $$\theta_2 = \frac{2\pi}{N} \cdot i,$$
$$i = 0, 1, \ldots, (N-1).$$

In this case, operations S620 through S670 may be iterated until i is from 0 to N−1.

In operation S630, the base station determines whether $(\alpha)^* e^{j\theta_2}$ is −1.

Where $(\alpha)^* e^{j\theta_2}$ is not −1 in operation S630, the base station calculates $$e^{j\theta_4} = -\frac{\alpha^* e^{j\theta_2}}{\gamma^*}$$

and $$e^{j\theta_3} = -\frac{1}{\beta^*}$$

in operation S641.

In operation S642, the base station calculates $T_2(\theta_2, \theta_3, \theta_4) = |v^H v_i|$.

Also, where $(\alpha)^* e^{j\theta_2}$ is not −1 in operation S630, the base station calculates $$e^{j\theta_3} = -\frac{\alpha^* e^{j\theta_2}}{\beta^*} \text{ and } e^{j\theta_4} = -\frac{1}{\gamma^*}$$

in operation S651. In operation S652, the base station calculates $T_3(\theta_2, \theta_3, \theta_4) = |v^H v_i|$.

On the other hand, where $(\alpha)^* e^{j\theta_2}$ is −1 in operation S630, the base station defines $$\theta_3 = \frac{2\pi}{N} \cdot i,$$
$$i = 0, 1, \ldots, (N-1)$$

in operation S661. Here, operation S661 and S662 may be iterated until i is from 0 to N−1.

In operation S662, the base station calculates $T_1(\theta_2, \theta_3, \theta_4) = |v^H v_i|$.

In operation S670, the base station calculates T=max(T1, T2,T3) and calculates $\theta_2^{opt}$, $\theta_3^{opt}$, and $\theta_4^{opt}$ corresponding to T. Here, the base station may calculate an optimal precoding vector $$v_{opt} = \frac{1}{2}[1 \quad e^{j\theta_2^{opt}} \quad e^{j\theta_3^{opt}} \quad e^{j\theta_4^{opt}}]^T$$

based on $\theta_2^{opt}$, $\theta_3^{opt}$, and $\theta_4^{opt}$.

Second Scheme

According to the second scheme, a constraint may be further imposed on the codebook C and the constraint may be given by the following Equation 11:

$$\Psi_i = \{v_j | \langle v_j, v_i \rangle = 0, v_j \in C\} \forall v_i \in C \quad (11).$$

Where a precoding vector for a user k is $f_k$ and a precoding vector for a user m is $f_m$, $f_k$ and $f_m$ may be defined as given by the following Equation 12:

$$f_k = \frac{1}{\left|\langle \hat{h}_{c,k}^H, v_j \rangle\right|} \operatorname*{argmax}_{v_j \in \Psi_m} \left|\langle \hat{h}_{c,k}^H, v_j \rangle\right| \text{ and} \quad (12)$$

$$f_m = \frac{1}{\left|\langle \hat{h}_{c,m}^H, v_j \rangle\right|} \operatorname*{argmax}_{v_j \in \Psi_k} \left|\langle \hat{h}_{c,m}^H, v_j \rangle\right|.$$

Here, $\hat{h}_{c,k}^H$ denotes an element that indicates a channel of the user k among elements of the codebook C, $\hat{h}_{c,m}^H$ denotes an element that indicates a channel of the user m among the elements of the codebook C, and $$\Psi_i = \{v_j \mid \langle v_j, v_i \rangle = 0, v_j \in C\} \ \forall \ v_i \in C$$

Since $p_k = \frac{P}{|S| \|f_k\|^2}$ and $p_m = \frac{P}{|S| \|f_m\|^2}$.

denote power normalization coefficients, and |S|=2, the power may be equally allocated across the user k and the user m.

The second scheme may be easily extended to support a rank greater than 2. For example, where the user k, the user m, and a user n exist, and the rank is "3", a number of non-orthogonal vectors may be "1". For example, $\hat{h}_{c,m}^H \perp \hat{h}_{c,n}^H$ and $\hat{h}_{c,k}^H = v_i$ may not be orthogonal to $\hat{h}_{c,m}^H$ and $\hat{h}_{c,n}^H$. Where $f_m = \hat{h}_{c,m}^H$, and $f_n = \hat{h}_{c,n}^H$, $f_k$ may be determined as $$f_k = \frac{1}{\left|\langle \hat{h}_{c,k}^H, v_j \rangle\right|} \operatorname*{argmax}_{v_j \in \Psi_m \cap \Psi_n} \left|\langle \hat{h}_{c,k}^H, v_j \rangle\right|$$

Here, $$\Psi_m = \left\{v_j \mid \langle \hat{h}_{c,m}^H, v_j \rangle = 0\right\}$$

and $$\Psi_n = \left\{v_j \mid \langle \hat{h}_{c,n}^H, v_j \rangle = 0\right\}.$$

Third Scheme

According to an exemplary embodiment, a base station may mix the aforementioned first scheme and second scheme. For example, the base station may use $$f_k = \operatorname*{argmin}_{f_k} \{LO_k^{Alt2-ZF}(f_k), \Gamma \cdot LO_k^{Alt1-ZF}(f_k)\},$$

and may also use $$f_k = \operatorname*{argmin}_{f_k} \{LO_k^{Alt2-ZF}(f_k), \Gamma \cdot LO_k^{Conv-ZF}(f_k)\}.$$

Here, $LO_k^{Alt1-ZF}(f_k)$ denotes the power loss in the first scheme, and $LO_k^{Alt2-ZF}$ denotes the power loss in the second scheme. Also, $LO_k^{Conv-ZF}$ denotes the power loss where a general transmit matrix is used in the zero-forcing mode. Γ denotes a threshold value greater than or equal to 1.

The methods described above including an operating method of a terminal and a base station may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable medium may be distributed among computer systems connected through a network and computer-readable codes or program instructions may be stored and executed in a decentralized manner.

According to certain example(s) described above, a terminal may effectively calculate channel direction information and channel quality information in a zero-forcing mode and a PU2RC mode.

The terminal may reduce the feedback overhead through a proposed feedback procedure, and may also support switching between the zero-forcing mode and the PU2RC mode.

Also, according to certain example(s) described above, a base station may design an optimized preceding vector or preceding matrix.

Also, according to certain example(s) described above, a multi-user MIMO communication system for constant modulus beamforming can be provided.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An operating method of a terminal in a multiple input multiple output (MIMO) communication system, the method comprising:
   calculating an inter-cell interference and/or an inner-cell interference from an effective received signal;
   calculating channel quality information and channel direction information in a zero-forcing beamforming mode based on the inter-cell interference and/or the inner-cell interference; and
   feeding back, to a serving base station, the channel direction information and the channel quality information.

2. The method of claim 1, wherein the calculating of the channel direction information and the channel quality information in the zero-forcing beamforming mode comprises:
   calculating a lower-bound of a signal-to-interference plus noise ratio (SINR) of the terminal in the zero-forcing beamforming mode using a Jensen's inequality; and
   calculating the channel direction information and the channel quality information based on the calculated lower-bound.

3. The method of claim 1, wherein the calculating of the channel direction information and the channel quality information in the zero-forcing beamforming mode comprises calculating a combining vector, used to generate the effective received signal from a received signal, in association with calculating of the channel direction information and the channel quality information.

4. The method of claim 1, wherein the calculating of the channel direction information and the channel quality information in the zero-forcing beamforming mode comprises calculating the channel direction information and the channel quality information in the zero-forcing beamforming mode, with the assumption that at least one neighboring base station of the serving base station has a maximum transmission power.

5. An operating method of a terminal in a MIMO communication system, the method comprising:
   calculating channel direction information and channel quality information in a zero-forcing beamforming mode with a first codebook corresponding to the zero-forcing beamforming mode;
   calculating medium information that represents a relationship between the channel quality information in the zero-forcing beamforming mode and channel quality information in a per user unitary rate control (PU2RC) mode by considering a second codebook corresponding to the PU2RC mode, wherein the second codebook is designed based on the first codebook; and
   feeding back the medium information to a serving base station.

6. The method of claim 5, further comprising:
   calculating channel direction information and channel quality information in the PU2RC mode with the second codebook.

7. The method of claim 6, wherein the calculating of the channel direction information and the channel quality information in the PU2RC mode comprises calculating the channel direction information and the channel quality information in the PU2RC mode by reusing the channel direction information and the channel quality information in the zero-forcing beamforming mode with the second codebook.

8. The method of claim 7, wherein the channel direction information in the PU2RC mode is calculated by a base station, based on the channel direction information in the zero-forcing beamforming mode and an angle or a chordal distance between elements of the second codebook.

9. The method of claim 7, wherein the calculating of the channel direction information and the channel quality information in the PU2RC mode comprises calculating the channel direction information in the PU2RC mode based on the channel direction information in the zero-forcing beamforming mode and an angle or a chordal distance between elements of the second codebook.

10. The method of claim 5, wherein the medium information is associated with a difference between the channel quality information in the zero-forcing beamforming mode and the channel quality information in the PU2RC mode.

11. The method of claim 5, further comprising feeding back the channel direction information and the channel quality information in the zero-forcing beamforming mode.

12. The method of claim 5, further comprising:
calculating an inter-cell interference and/or an inner-cell interference from an effective received signal.

13. The method of claim 5, further comprising:
feeding back, to the serving base station, an indicator that indicates whether a dedicated reference signal is required.

14. An operating method of a base station in a MIMO communication system, the method comprising:
recognizing channels formed between at least two users and the base station, based on feedback information that is transmitted from the at least two users;
setting an initial value of a precoding vector $$v = \frac{1}{2}[1 \quad e^{j\theta_2} \quad e^{j\theta_3} \quad e^{j\theta_4}]^T$$

for a target user by considering a channel $$v_j = \frac{1}{2}[1 \quad \alpha \quad \beta \quad \gamma]^T$$

of a neighboring user, where $\alpha, \beta, \gamma$ denote complex numbers;
calculating $|v^H v_i|$ where $v_i$ denotes a channel of the target user, using at least one scheme among at least two schemes that are pre-defined according to a value of $(\alpha)^* e^{j\Theta_2}$; and
optimizing the precoding vector $$v = \frac{1}{2}[1 \quad e^{j\theta_2} \quad e^{j\theta_3} \quad e^{j\theta_4}]^T$$

based on the calculated $|v^H v_i|$.

15. The method of claim 14, wherein the calculating of $|v^H v_i|$ comprises calculating $|v^H v_i|$ by using $$e^{j\theta_4} = -\frac{\alpha^* e^{j\theta_2}}{\gamma^*} \text{ and } e^{j\theta_3} = -\frac{1}{\beta^*}$$

according to the value of $(\alpha)^* e^{j\Theta_2}$.

16. The method of claim 14, wherein the calculating of $|v^H v_i|$ comprises calculating $|v^H v_i|$ by using $$e^{j\theta_3} = -\frac{\alpha^* e^{j\theta_2}}{\beta^*} \text{ and } e^{j\theta_4} = -\frac{1}{\gamma^*}$$

according to the value of $(\alpha)^* e^{j\Theta_2}$.

17. The method of claim 14, wherein the calculating of $|v^H v_i|$ comprises calculating $|v^H v_i|$ by using $$\theta_3 = \frac{2\pi}{N} \cdot i \text{ and}$$

$$e^{j\theta_4} = -\frac{\beta^* e^{j\theta_3}}{\gamma^* *}$$

according to the value of $(\alpha)^* e^{j\Theta_2}$.

18. An operating method of a base station in a MIMO communication system, the method comprising:
recognizing channels formed between a user k and a user m, and the base station, based on feedback information that is transmitted from the user k and the user m;
generating $\Psi_m$ and $\Psi_k$ according to $\Psi_i = \{v_j | \langle v_j, v_i \rangle = 0, v_j \in C\} \forall v_i \in C$, where C denotes a codebook; and
determining, using $\Psi_m$ and $\Psi_k$, a precoding vector for the user k as $$f_k = \frac{1}{|\langle \hat{h}_{c,k}^H, v_j \rangle|} \underset{v_j \in \Psi_m}{\operatorname{argmax}} |\langle \hat{h}_{c,k}^H, v_j \rangle|$$

where $\hat{h}_{c,k}^H$ denotes an element indicating a channel of the user k among elements of the codebook, and a precoding vector for the user m as $$f_m = \frac{1}{|\langle \hat{h}_{c,m}^H, v_j \rangle|} \underset{v_j \in \Psi_k}{\operatorname{argmax}} |\langle \hat{h}_{c,m}^H, v_j \rangle|$$

where $\hat{h}_{c,m}^H$ denotes an element indicating a channel of the user m among the elements of the codebook.

19. An operating method of a terminal in a MIMO communication system, the method comprising:
calculating channel direction information and channel quality information in a zero-forcing beamforming mode with a first codebook corresponding to the zero-forcing beamforming mode; and
calculating channel direction information and channel quality information in a PU2RC mode by reusing the channel direction information and the channel quality information in the zero-forcing beamforming mode by considering a second codebook corresponding to the PU2RC mode, wherein the second codebook is designed based on the first codebook.

20. An operating method of a base station in a MIMO communication system, the method comprising:
receiving at least one of channel direction information and channel quality information in a zero-forcing beamforming mode that are generated based on a first codebook corresponding to the zero-forcing beamforming mode, and channel direction information and channel quality information in a PU2RC mode that are generated based on a second codebook corresponding to the PU2RC mode, wherein the second codebook is designed based on the first codebook; and
calculating the channel direction information and the channel quality information in the PU2RC mode based on the channel direction information and the channel quality information in the zero-forcing beamforming mode, or calculating the channel direction information and the channel quality information in the zero-forcing beamforming mode based on the channel direction information and the channel quality information in the PU2RC mode.

21. The method of claim 20, further comprising:
receiving medium information that represents a relationship between the channel quality information in the zero-forcing beamforming mode and the channel quality information in the PU2RC mode,
wherein the calculating of the channel direction information and the channel quality information in the PU2RC mode or the calculating of the channel direction information and the channel quality information in the zero-forcing beamforming mode comprises calculating the channel direction information and the channel quality information in the PU2RC mode based on the channel direction information and the channel quality information in the zero-forcing beamforming mode using the medium information, or calculating the channel direction information and the channel quality information in the zero-forcing beamforming mode based on the channel direction information and the channel quality information in the PU2RC mode using the medium information.

22. The method of claim 20, wherein the calculating of the channel direction information and the channel quality information in the PU2RC mode or the calculating of the channel direction information and the channel quality information in the zero-forcing beamforming mode comprises calculating the channel direction information and the channel quality information in the PU2RC mode by reusing the channel direction information and the channel quality information in the zero-forcing beamforming mode, or calculating the channel direction information and the channel quality information in the zero-forcing beamforming mode by reusing the channel direction information and the channel quality information in the PU2RC mode.

* * * * *